United States Patent [19]

Bollen et al.

[11] 4,175,147

[45] Nov. 20, 1979

[54] METHOD TO REDUCE DEPOSITS OF TEREPHTHALIC ACID ON COOLING ROLLS DURING SHEET EXTRUSION OF AMORPHOUS POLYETHYLENE TEREPHTHALATE

[75] Inventors: Philip S. Bollen, Auburn; Alfieri Degrassi, Pottsville, both of Pa.

[73] Assignee: Allied Chemical Corporation, Morris Township, Morris County, N.J.

[21] Appl. No.: 729,739

[22] Filed: Oct. 5, 1976

[51] Int. Cl.$^2$ .................... C09D 5/16; C08G 39/10
[52] U.S. Cl. ............................ 428/35; 264/39; 264/169; 264/211; 264/216; 264/292; 525/419
[58] Field of Search ............... 260/860; 264/39, 169, 264/216, 292, 211; 428/35

[56] References Cited

U.S. PATENT DOCUMENTS

| | | | |
|---|---|---|---|
| 3,502,757 | 3/1970 | Spencer | 264/169 |
| 3,520,959 | 7/1970 | Busby | 264/169 |
| 3,752,866 | 8/1973 | Doerr | 260/860 |
| 3,975,485 | 8/1976 | Bollen et al. | 264/92 |

*Primary Examiner*—Jay H. Woo
*Attorney, Agent, or Firm*—Robert J. North; Richard A. Anderson; Patrick L. Henry

[57] ABSTRACT

Physically blending small amounts of polycarbonate resin into polyethylene terephthalate resin which is to be extruded and cooled to form an unoriented amorphous sheet reduces deposits of terephthalic acid on the cooling rolls during sheet extrusion.

16 Claims, No Drawings

METHOD TO REDUCE DEPOSITS OF TEREPHTHALIC ACID ON COOLING ROLLS DURING SHEET EXTRUSION OF AMORPHOUS POLYETHYLENE TEREPHTHALATE

BACKGROUND OF THE INVENTION

1. Field of the Invention

This invention relates to transparent sheets formed from blends of polycarbonate and polyethylene terephthalate resins, a process for their production and containers formed therefrom.

2. Discussion of the Prior Art

Polyethylene terephthalate (sometimes referred to as "PET") resins can be employed to prepare transparent film and sheet. Usually the resin is extruded into an amorphous flat sheet, which is then biaxially stretched and thereafter heat set to impart a desired degree of crystallization to the sheet. Such biaxially oriented and crystallized products are strong and clear but cannot readily be formed into containers since the process of biaxially stretching removes most of the extensibility of the sheet. If amorphous PET sheet is produced by rapid cooling of the molten sheet, a clear and transparent product may be obtained which is formable into containers. These containers soften at too low a temperature to permit their use in hot-filled food packaging applications where the filling may typically be at a temperature of about 150° to 180° F. or greater which facilitates rapid filling of viscous products as well as destroying bacteria. However, for lower temperature filling food packaging, at temperatures from about 100° to 140° F., these containers are useful.

If PET sheet is produced by slow cooling of the molten resin, the product obtained is partially crystallized, milky and brittle and hence unsuited for container fabrication. If PET sheet is rapidly cooled, with a cooled surface, such as a cooling roll, deposits of decomposition products such as terephthalic acid rapidly form on the cooling surface.

The effect of moisture on polyethylene terephthalate in the melt state is well known, in that rapid hydrolytic cleavage of the polymer molecules takes place, the number of such cleavages being in direct proportion to the quantity of water present. This, of course, results in a drop of the average molecular weight of the polymer. In some commercial extrusion processes, some moisture is always present during extrusion at a level generally of 0.005–0.02 percent due to the inefficiencies of commercial hopper driers and the extreme rapidity with which PET resin absorbs moisture. Very costly vacuum drying equipment and elaborate nitrogen blanketing is required to reduce the moisture level to zero. However, the drop in molecular weight experienced does not affect the usefulness of the sheet product.

The critical effect of moisture is that some hydrolysis occurs on the end unit of the polymer resulting in the liberation of terephthalic acid. In order to produce clear amorphous sheet, after leaving the die the melt is rapidly quenched by passing it through a three-roll stack whose surface temperature is kept in the range of 50°–175° F. These temperatures are sufficiently low to cause condensation of the terephthalic acid on the roll surfaces. This deposit becomes increasingly difficult to remove as the run proceeds as the hot sheet "bakes" it to the rolls, particularly the center roll. Before the invention it was necessary to continuously wipe the rolls by hand and, because of the design of the equipment, the center roll was difficult and dangerous to wipe unless the line was stopped, resulting in loss of production. The effect of this deposit is to cause poor polishing of the sheet, giving rise to haze and streaks and thus producing an unsightly product.

Although it is known that lower intrinsic viscosity PET resins may be modified by the addition of polycarbonates, as is described in U.S. Pat. No. 3,218,372 to Okamura et al., issued in 1965, in order to increase the hardness, strength and electrical properties of the molding material, that disclosure was limited to much larger amounts of polycarbonate resin, i.e., a minimum of 10 percent.

In copending U.S. Ser. No. 625,299, filed Oct. 23, 1975 now abandoned, a sheet intended for hot filled applications, 150° to 180° F. or higher, uniformly blended from about 80 to 95 percent PET and 20 to 5 percent polycarbonate is disclosed.

U.S. Pat. Nos. 3,956,229 and 3,975,485, hereby incorporated by reference, in toto, there is described film and sheet formed from blends of 60 to 85 parts of PET having an intrinsic viscosity of at least about 0.90 and 40 to 15 parts of a polycarbonate resin. Such film or sheet, which has a degree of crystallinity in the range of about 20 to 40 percent, is essentially nonoriented and may be thermoformed into cook-in trays and like articles. The film or sheet disclosed therein is formed by blending the polymers, extruding the blend at a temperature above about 500° F. onto a moving support and cooling the support to a surface temperature of about 225° to 380° F. Although such film and sheet have requisite strength and toughness to be utilized for cook-in tray applications, such sheets have a very high degree of haziness and consequently would not be suitable for applications wherein a clear sheet is desired. In U.S. Pat. No. 3,975,355, there is described film or sheet which comprises a similar blend of PET and polycarbonate and about 5 to 20 parts by weight of a nonacidic silica filler such as novaculite. However, such film or sheet likewise has a degree of haziness which precludes its utilization is hot filled or even for fillings heated to 100° to 140° F., wherein a clear and transparent sheet is required.

In U.S. Pat. No. 3,720,732, a disclosure limited to a biaxially oriented PET film discusses adding small amounts of polycarbonate to the resin to improve heat stability and slip properties. The invention of this application is directed to unoriented, amorphous sheet and improved processing thereof, rather than product properties of oriented film.

SUMMARY OF THE INVENTION

In accordance with this invention, there is provided a sheet suitable to be formed and filled with heated foods and being formed from a uniform blend of from about 97.5 to 99.9 by weight of PET having an intrinsic viscosity of above about 0.9 and a melt viscosity at 525° F. of above about 10,000 poises and correspondingly from about 2.5 to 0.1 percent by weight of a polycarbonate resin having an intrinsic viscosity of about 0.4 to 0.6 and melt viscosity at 500° F. of less than 50,000 poises; said sheet having a haze value as determined by ASTM D-1003 of less than about 2 percent and being essentially amorphous and nonoriented. When the sheet of this invention is extruded and rapidly cooled by contact with a cooling surface, deposits onto the cooling surface are reduced. There is also provided containers which may be thermoformed from such sheet at temperatures in the range of about 210° to 280° F. Further, in accordance with this invention, there is provided a process of forming such sheet which comprises uniformly blending a composition of about 97.5 to 99.9 percent PET having an intrinsic viscosity of above about 0.9 and a melt viscosity at 525° F. of above about 10,000 poises with about 2.5 to 0.1 percent by weight of a polycarbonate resin having an intrinsic viscosity of 0.4 to 0.6 and a melt viscosity at 500° F. of less than about 50,000 poises, extruding said blend at a temperature between about 490° to 530° F. whereby a sheet is formed, and cooling said sheet by contact with at least one cooling surface maintained at a surface temperature in the range of about 50° to 160° F. for a period of time not exceeding about 15 seconds, whereby an essentially amorphous and nonoriented sheet is obtained; that so tht deposits onto the cooling surface are reduced.

It has been found that the selection of the PET and polycarbonate resins are critical as is the extrusion temperatures and cooling rate. The PET resins employed herein impart an increased deformation resistance to containers formed from the blended sheet as well as improved uniformity of optical properties. Moreover, in order to avoid formation of gas bubbles due to polymer decomposition, the blend must be extruded at temperatures below about 530° F. and above about 490° F. In addition, the temperatures utilized to form containers from the sheet must be in the range of about 210° to about 280° F., the lower limit relates to the inability to form containers of precise dimensions while above the upper limit the containers become excessively hazy and lose transparency.

DESCRIPTION OF THE PREFERRED EMBODIMENT

The polyethylene terephthalate (hereinafter "PET") employed herein is a polymer having an intrinsic viscosity of at least 0.90, the intrinsic viscosity being measured in a mixed solvent of 60 parts by weight phenol and 40 parts by weight tetrachloroethane at 25° C. Preferably, the intrinsic viscosity is in the range of about 0.9 to 1.2, more preferably about 0.9 to 1.0. The PET resin has a melt viscosity measured at 525° F. of above about 10,000 poises, preferably between about 10,000 to 30,000 poises. The polycarbonate resin employed herein may be any polycarbonate, such as the reaction product of phosgene or a carbonic acid diester, such as diphenol carbonate with bisphenol A, i.e., poly(4,4'-isopropylidene diphenylene carbonate). The polycarbonate has an intrinsic viscosity in the range of about 0.4 to 0.6 as measured in dioxane solvent at 30° C. Preferably, the polycarbonate has an intrinsic viscosity in the range of about 0.4 to 0.5. The polycarboante resin has a melt viscosity at 500° F. of less than 50,000 poises and preferably less than about 30,000 poises; most preferably, the polycarbonate has a melt viscosity of about 5,000 to 30,000 poises. The intrinsic viscosity and melt viscosity referred to herein are the viscosities measured before blending the two polymers.

As referred to above, blends of from about 97.5 to 99.9 percent by weight of PET and correspondingly from about 2.5 to 0.1 percent by weight of polycarbonate are employed herein. It has been found that below about 0.1 percent by weight polycarbonate, the reduction in deposits of terephthalic acid on the cooled surface is accomplished only with a significant lowering of the moisture content of the PET, whereas above 2.5 percent by weight of carbonate there is no added benefit regarding deposits, i.e., the deposits have been reduced to levels such that no further reduction could be noted. Preferably, the amount of polycarbonate in the blend ranges from about 0.5 to 1.5 by weight. It is preferred to physically blend the two resins in pellet or powder form at about ambient temperatures. Any suitable mixing equipment may be employed which provide a uniform blend, such as drum tumblers, ribbon blenders and the like. It has been found that if the polymers are blended in their melted state as suggested in the aforesaid Okamura et al. patent, degradation of the polycarbonate resin occurs which results in gas bubbles being formed in the sheet. It has also been found desirable to dry the mixture to a moisture level below about 0.02 percent by weight since high moisture levels may result in rapid hydrolytic decomposition of both resins. Such decomposition introduces further problems in obtaining uniform mixing of the resins as well as results in the formation of undesirable gas bubbles.

The blended mixture is thereafter extruded into a sheet at temperatures in the range of about 490° to 530° F. As used herein, the term "sheet" is intended to mean thin cast, extruded or otherwise formed products which have a thickness up to about 50 mils or more and preferably about 5 to 25 mils and most preferably about 10 to 20 mils. As such, the term "sheet" includes "films" (i.e., structures having thickness of below 10 mils) and "sheets" (i.e., structures having thickness above 10 mils) as both terms are used in the plastic film industry. The extrusion temperatures refer to temperatures in the extruder die. Any suitable melt extrusion apparatus can be employed to extrude the sheet.

The sheet is extruded through the extruder onto one or more cooling surfaces, preferably rotating or moving support(s), which are cooled to a surface temperature in the range of about 50° to 160° F., and preferably in the range of about 80° to 120° F. The sheet is in contact with the cooling surfaces for a period of time not exceeding about 15 seconds, preferably not exceeding about 10 seconds, in order to cool the sheet into an essentially amorphous structure. The minimum contact time is that sufficient to cool the sheet and may be in the range of about 0.04 second and is preferably in the range of about 1 second. The contact time is dependent upon the thickness and width of the sheet, the speed of the sheet and the temperature and size of the cooling surface. For example, using a three 16 inch diameter roll system with an S-wrap (described below), the contact time may be in the range of about 3 to 15 seconds for sheet of 25 mil thickness and 45 inches width and with a sheet speed in the range of about 15 to 75 feet per minute. On the other hand, for sheet of 15 mil thickness (other parameters being the same), the contact time may be in the range of about 1.5 to 7.5 seconds, for example.

Preferably, the sheet is extruded directly into a stack of three chill rolls rotating at substantially the same speed. For example, the blend may be charged to a screw extruder wherein the blend is melted and additional mixing occurs and the sheet exists through a flat die head into the nip formed by a pair of rotating casting or cooling rolls which may be of any conventional type. For instance, chromium plated rolls provided with necessary internal cooling means (water or organic solvent) may be employed. The sheet is carried over a generally S-shaped cooling roll path, beginning over the bottom of the two rollers that form the nip and thence around a third roller in contact with the second roller. The third roller serves to further cool down the sheet. As is well understood by those skilled in the art, the rate of extrusion, the width of the extruder die orifice, and the speed of the casting rolls may be varied widely and determine the thickness of the sheet. Alternatively, the sheet may be cast directly onto a single casting roll provided with cooling means, or between the nip of a pair of cooling rolls rotating at substantially the same speed and without utilizing a third roll in contact therewith. In any case, following extrusion, the sheet may be further cooled down prior to collecting the same by passing the sheet over one or more additional rolls in a manner generally employed for extrusion of films and sheets. Such additional rolls may be heated or unheated. However, any such additional rolls move or rotate at substantially the same linear speed as the casting rolls so that the sheet is not subjected to a drawing or stretching operation which would orient the same. The sheet is collected utilizing conventional apparatus such as a winding roll or the like.

The sheet of this invention is essentially nonoriented, i.e., has a machine direction minimum elongation at break of at least about 200 percent, preferably at least about 300 percent. The sheet is essentially amorphous, i.e., the PET portion of the sheet is essentially noncrystallized and has a degree of crystallinity of less than about 5 percent. The crystallinity referred to is that obtained by the density method as described in "Engineering Design for Plastic," E. Baer, Reinhold Publishing Company, 1964, pages 98–99. The sheet has a very low haze level (as determined by ASTM D-1003) of less than about 2 percent, preferably less than about 1 percent, and has excellent uniformity of transparency.

It has been found that the sheet produced in accordance with this invention is eminently suitable for forming high clarity containers useful in hot filling applications such as packaging of syrups, sauces and other food products which are heated in the range of about 100° to 140° F. during the filling operation. Such containers evidence little, if any, distortion during filling, and retain their high clarity.

In order to further describe the present invention, the following nonlimiting examples are given.

EXAMPLE 1 (COMPARATIVE)

A sheet of 10 mil thickness was prepared from 100 percent PET resin (containing no polycarbonate) having an intrinsic viscosity of 0.95, a moisture content of about 0.02 percent and a melt viscosity of 525° F. of about 13,000 poises. A 3.5 inch extruder was used with extrusion temperatures maintained in the range of about 495° to 520° F. The molten polymer was passed through a 34-inch wide slit die which was located about 2 inches from the nip formed by a pair of rotating water chilled rolls which were maintained at surface temperatures in the range of 85° to 115° F. The sheet was cast upon such rolls and was then further cooled with a roll held to a surface temperature of 65° F. and thereafter collected on a winding roll. After only two hours running time, the polished surface of the cooling rolls was heavily streaked with a coating of deposits of terephthalic acid causing an unsightly sheet having streaks and haze, due to poor polishing of the freshly extruded sheet.

EXAMPLE 2

Using the same method to prepare a PET sheet, as in Example 1, sheets were prepared containing various small amounts of polycarbonate uniformly blended into the PET polymer prior to being fed as dry resin to the extruder. Levels of 0.1 percent, 0.5 percent and 1 percent polycarbonate were evaluated. The specific quantity of polycarbonate required would be dependent on the moisture level of the resin and, although significant reduction in plate-out occurred at the 0.1 percent level with low moisture levels, i.e., 0.005 percent, it has been found that for simplicity in production a one percent level is effective for the range of moisture levels encountered when recycling edge trims, etc. After two hours running time with 1 percent polycarbonate, the polished surface of the cooling rolls was still bright and shiny with no streaks or any evidence of any deposits of terephthalic acid or any other material. While the mechanism is not fully understood, we believe that either the terephthalic acid is soluble in the polycarbonate phase, or an ester interchange reaction occurs with the elimination of carbon dioxide gas.

EXAMPLE 3

Sheet of 10 mil thickness containing 1 percent polycarbonate resin is produced under conditions of Example 2. Containers 8×6×1.5 inches were formed on a Thermtrol pressure-type thermoforming machine in which the sheet was heated to temperatures in the range of 210° to 280° F. using the heating of 0.5 second dwell time. No distortion was seen in containers which were heated to 140° F. in water. No haze or streaks were apparent in the container.

EXAMPLE 4

Containers formed in a manner similar to that of Example 3 from the sheet of Example 2 is filled with jelly which was at a temperature of 140° F. There was no visual distortion or spill-over of the jelly after the containers were cooled.

It will be understood that variations and modifications of the present invention may be made without departing from the scope of the invention. It is also to be understood that invention is not to be interpreted as limited to the specific embodiment disclosed herein, but only in accordance with the appended claims when read in light of the foregoing disclosure.

We claim:

1. A sheet suitable to be formed and filled with heated foods and being formed from a uniform blend of from about 97.5 to 99.9% by weight of polyethylene terephthalate having an intrinsic viscosity of above about 0.9 and a melt viscosity at 525° F. of above about 10,000 poises and correspondingly from about 2.5 to 0.1% by weight of a polycarbonate resin having an intrinsic viscosity of about 0.4 to 0.6 and a melt viscosity at 500° F. of less than 50,000 poises; said sheet having a haze value as determined by ASTM D-1003 of less than about 2% and being essentially amorphous and non-oriented, so that when said sheet is extruded and rapidly cooled by contact with a cooling surface, deposits onto said cooling surface are reduced.

2. The sheet of claim 1 being formed from a blend comprising about 98.5 to 99.5% by weight polyethylene terephthalate and correspondingly about 1.5 to 0.5% by weight polycarbonate.

3. The sheet of claim 2 wherein said polycarbonate is poly(4,4'-isopropylidene diphenylene carbonate).

4. The sheet of claim 1 wherein said polyethylene terephthalate has an intrinsic viscosity of about 0.9 to 1.2 and a melt viscosity at 525° F. of about 10,000 to 50,000 poises.

5. The sheet of claim 1 wherein said polycarbonate has an intrinsic viscosity of about 0.4 to 0.5 and a melt viscosity at 500° F. of less than about 30,000 poises.

6. A container thermoformed from the sheet of claim 1.

7. A process of forming a sheet which comprises:
   a. uniformly blending a composition comprising about 97.5 to 99.9% by weight polyethylene terephthalate having an intrinsic viscosity of greater than 0.9 and a melt viscosity at 525° F. of above about 10,000 poises with correspondingly about 2.5 to 0.1% by weight of a polycarbonate resin having an intrinsic viscosity of 0.4 to 0.6 and a melt viscosity at 500° F. of less than about 50,000 poises;
   b. extruding said composition at a temperature between about 490° to 530° F. whereby a sheet is obtained; and
   c. rapidly cooling the resultant sheet by contact with at least one cooling surface maintained at a surface temperature in the range of about 50° to 160° F. for a period of time not exceeding about 15 seconds, whereby an essentially amorphous and non-oriented sheet is obtained; so that deposits onto said cooling surface are reduced.

8. The process of claim 7 wherein said contact time is less than about 10 seconds.

9. The process of claim 7 wherein said composition comprises about 98.5 to 99.5% by weight polyethylene terephthalate and correspondingly about 1.5 to 0.5% by weight polycarbonate.

10. The process of claim 7 wherein said polyethylene terephthalate has an intrinsic viscosity of about 0.9 to 1.2 and a melt viscosity at 525° F. of about 10,000 to 50,000 poises and said polycarbonate is poly(4,4'-isopropylidene diphenylene carbonate) and has an intrinsic viscosity of about 0.4 to 0.5 and a melt viscosity at 500° F. of less than about 30,000 poises.

11. The process of claim 7 wherein said blended composition is dried to a water content of less than about 0.02% by weight prior to extrusion.

12. The process of claim 7 wherein said composition is extruded onto at least two rotating cooling rolls maintained at a surface temperature of about 80 to 120° F. and rotating at substantially the same speed.

13. The process of claim 12 wherein a pair of internally cooled chill rolls are employed to cool said sheet.

14. The process of claim 12 wherein a stack of three chill rolls is employed to cool said sheet.

15. The process of claim 7 wherein said contact time is in the range of about 0.04 to 10 seconds.

16. The process of forming a container suitable for use in the filling of heated foods which comprises thermo-forming the sheet of claim 1 at a temperature of about 210° to 280° F. into said container.

* * * * *